(12) United States Patent
D'Souza et al.

(10) Patent No.: US 7,822,017 B2
(45) Date of Patent: Oct. 26, 2010

(54) SECURE VOICE SIGNALING GATEWAY

(75) Inventors: Scott David D'Souza, Ottawa (CA); Olivier Le Moigne, Ottawa (CA)

(73) Assignee: Alcatel Lucent, Paris (FR)

(*) Notice: Subject to any disclaimer, the term of this patent is extended or adjusted under 35 U.S.C. 154(b) by 1742 days.

(21) Appl. No.: 10/990,472

(22) Filed: Nov. 18, 2004

(65) Prior Publication Data

US 2006/0104261 A1 May 18, 2006

(51) Int. Cl.
H04L 12/66 (2006.01)

(52) U.S. Cl. ............ 370/352; 370/338; 379/88.23; 379/219; 455/423; 455/428; 704/270.1; 709/246; 713/153; 726/22

(58) Field of Classification Search ............ 370/352, 370/389, 338; 380/270, 278; 455/436, 423, 455/428; 709/238, 246; 713/150, 151, 153, 713/154, 185, 202; 726/13, 22; 379/88.23, 379/219; 704/270.1

See application file for complete search history.

(56) References Cited

U.S. PATENT DOCUMENTS

| | | | | |
|---|---|---|---|---|
| 6,341,128 B1 * | 1/2002 | Svedberg | | 370/352 |
| 6,889,321 B1 * | 5/2005 | Kung et al. | | 713/153 |
| 7,228,129 B1 * | 6/2007 | Ward et al. | | 455/423 |
| 7,359,493 B1 * | 4/2008 | Wang et al. | | 379/88.23 |
| 7,370,194 B2 * | 5/2008 | Morais et al. | | 713/153 |
| 7,441,043 B1 * | 10/2008 | Henry et al. | | 709/238 |
| 7,472,068 B2 * | 12/2008 | Koch | | 704/270.1 |
| 7,480,284 B2 * | 1/2009 | Wengrovitz et al. | | 370/352 |
| 7,525,950 B1 * | 4/2009 | Zhang | | 370/352 |
| 7,526,803 B2 * | 4/2009 | D'Souza et al. | | 726/22 |
| 2002/0023231 A1 * | 2/2002 | Pathuel | | 713/202 |
| 2002/0199021 A1 * | 12/2002 | Beier | | 709/246 |
| 2003/0059021 A1 * | 3/2003 | Meyerson et al. | | 379/219 |
| 2003/0095542 A1 * | 5/2003 | Chang et al. | | 370/352 |
| 2003/0137959 A1 * | 7/2003 | Nebiker et al. | | 370/338 |
| 2004/0068648 A1 * | 4/2004 | Lewis et al. | | 713/153 |
| 2004/0203783 A1 * | 10/2004 | Wu et al. | | 455/436 |
| 2004/0221156 A1 * | 11/2004 | Genevois et al. | | 713/154 |
| 2004/0236939 A1 * | 11/2004 | Watanabe et al. | | 713/150 |
| 2005/0050316 A1 * | 3/2005 | Peles | | 713/151 |
| 2005/0175184 A1 * | 8/2005 | Grover et al. | | 380/278 |
| 2006/0005040 A1 * | 1/2006 | Roberts | | 713/185 |
| 2006/0046714 A1 * | 3/2006 | Kalavade | | 455/428 |
| 2006/0104261 A1 * | 5/2006 | D'Souza et al. | | 370/352 |
| 2006/0112425 A1 * | 5/2006 | Smith et al. | | 726/13 |
| 2008/0267409 A1 * | 10/2008 | Raike | | 380/278 |
| 2009/0022152 A1 * | 1/2009 | Henry et al. | | 370/389 |
| 2009/0279701 A1 * | 11/2009 | Moisand et al. | | 380/270 |

* cited by examiner

*Primary Examiner*—Gerald Gauthier
(74) *Attorney, Agent, or Firm*—Kramer & Amado P.C.

(57) ABSTRACT

Systems and methods of providing secure signaling for voice communications over a public switched voice network (PSTN) are described. The call signaling is received at a first secure voice signaling gateway (SVSG) in which it is encrypted utilizing a security key. The encrypted payload is tunneled from the first SVSG to a second SVSG at a destination network element. The destination SVSG decrypts the payload and passes it on to the destination. According to the invention the communication can be either masqueraded in which the address of the first SVSG is given as the origin or non-masqueraded in which the actual original of the voice communication is retained.

21 Claims, 6 Drawing Sheets

SVSG Encryption Flow Chart

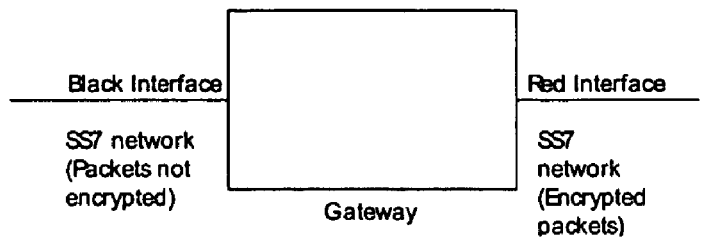
Figure 1: SS7 VPN Gateway (SVSG) overview
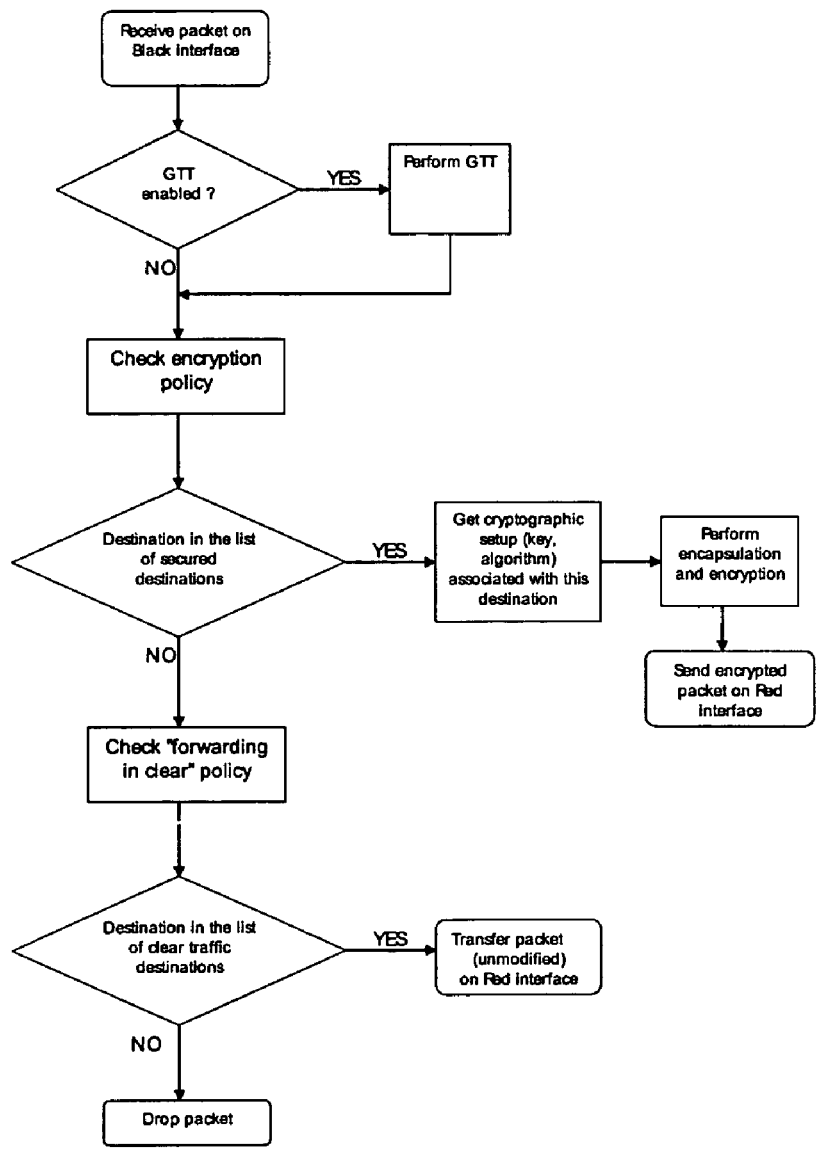
Figure 2: SVSG Encryption Flow Chart

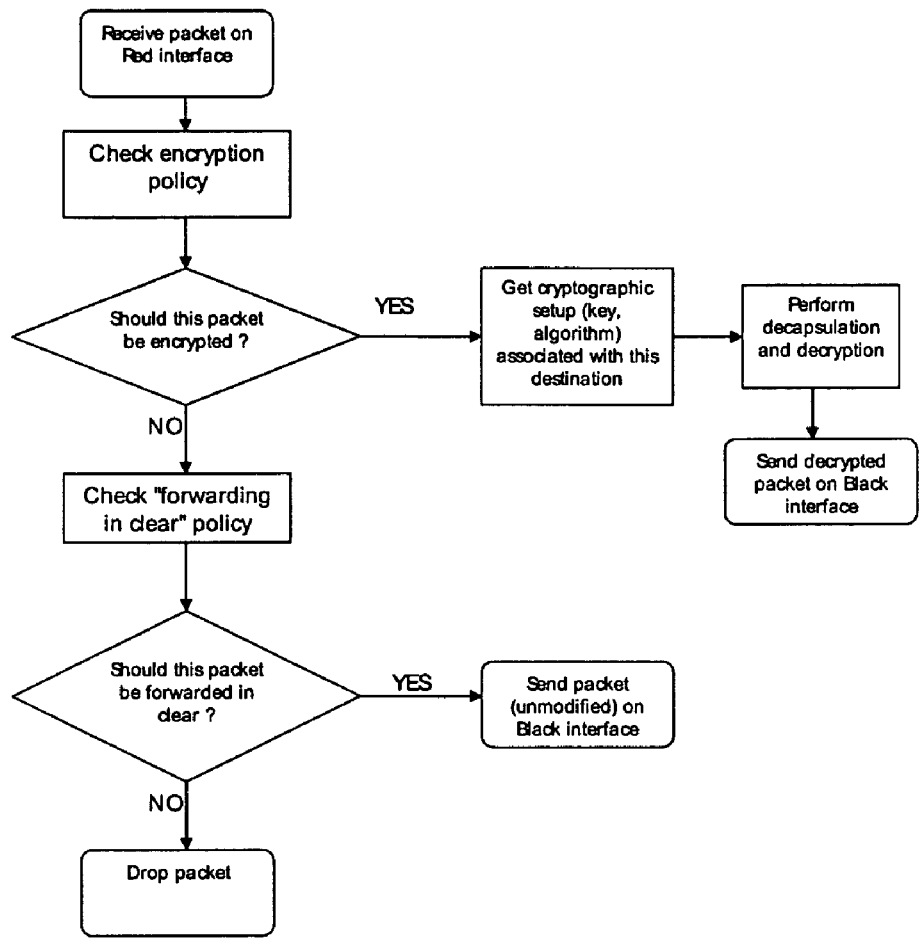
Figure 3: SVSG Decryption Flow Chart
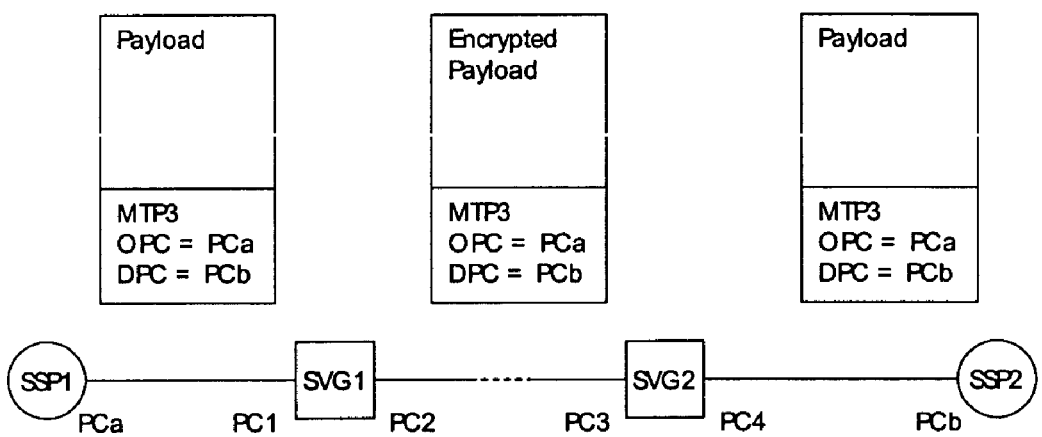
Figure 4: Payload Encryption without Masquerading (MTP usage)

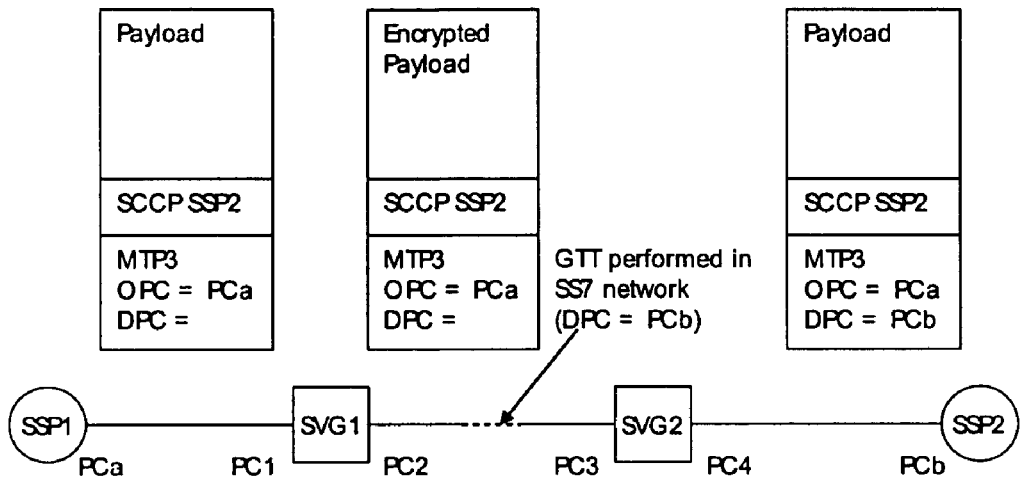
Figure 5: Payload Encryption without Masquerading (SCCP usage)
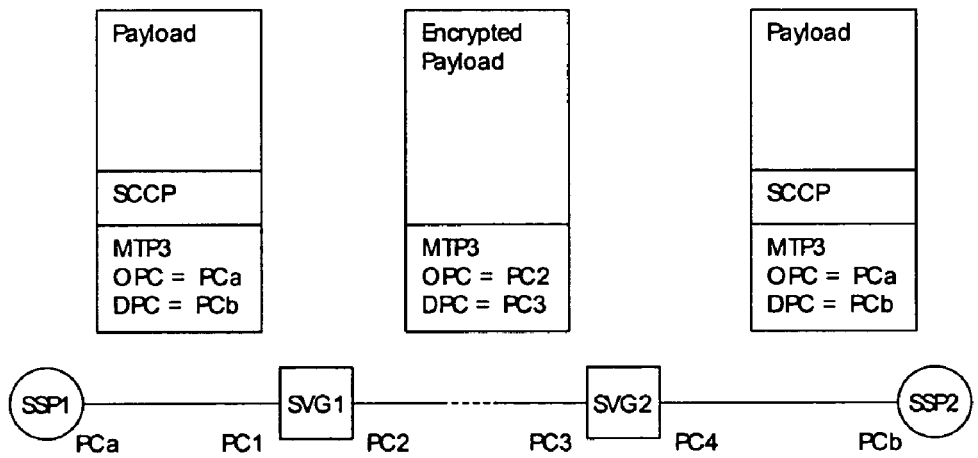
Figure 6: Tunnelling Mode with Masquerading (usage of MTP between SVSGs)

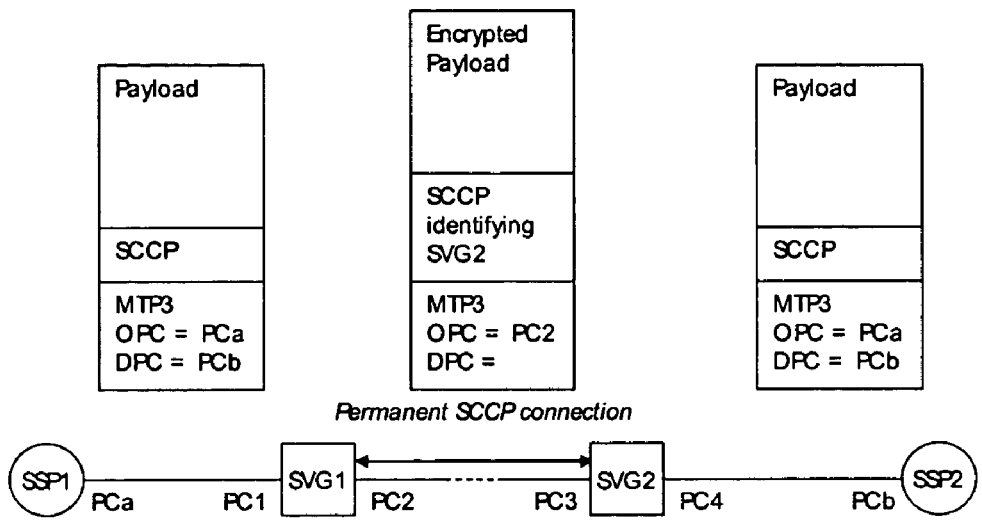
Figure 7: Tunnelling Mode with Masquerading (usage of SCCP between SVSGs)
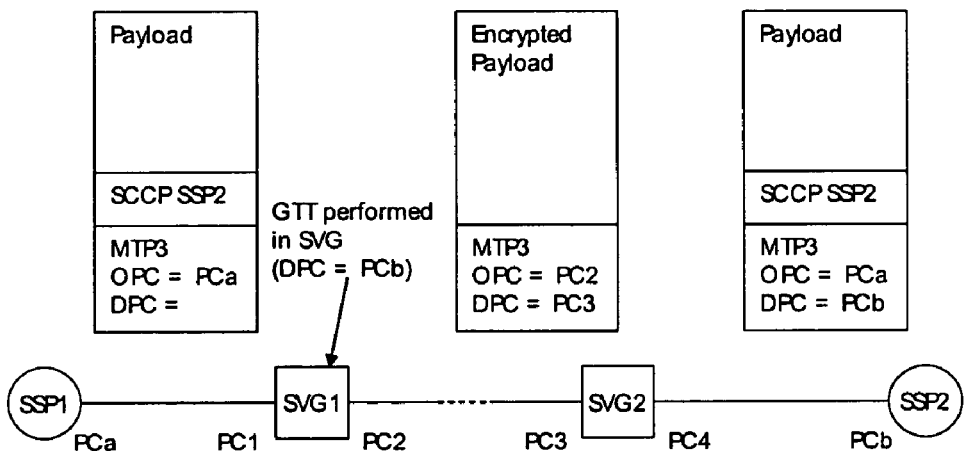
Figure 8: SVSG with GTT capabilities

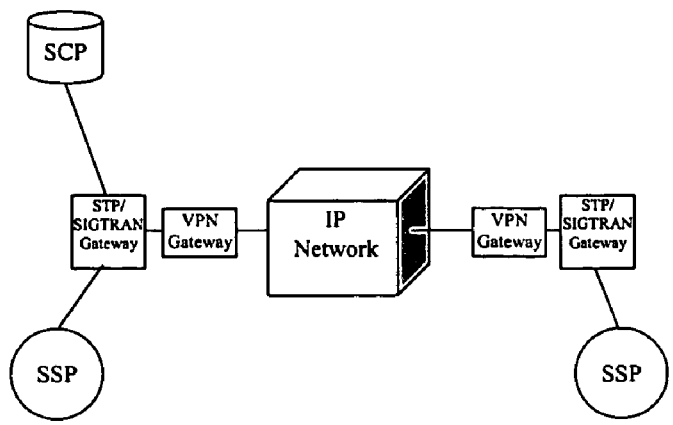
Figure 9: SS7 VPN Using Standard VPN Gateways
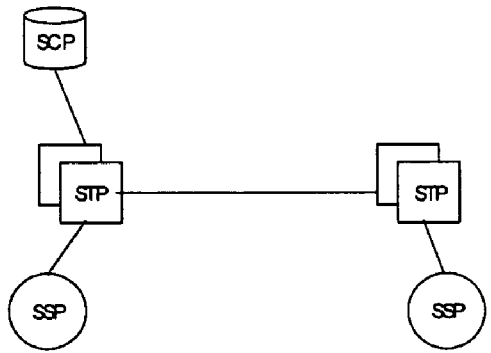
Figure 10: SS7 Simple Network View
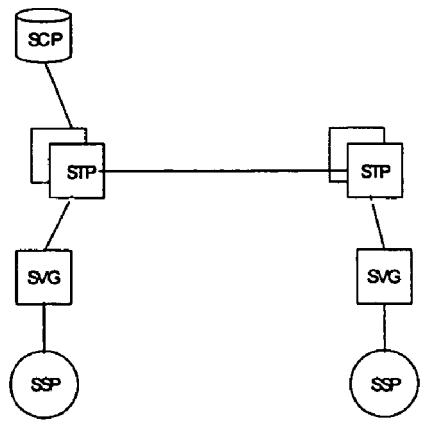
Figure 11: Example of SVSG Deployment between Two SSPs

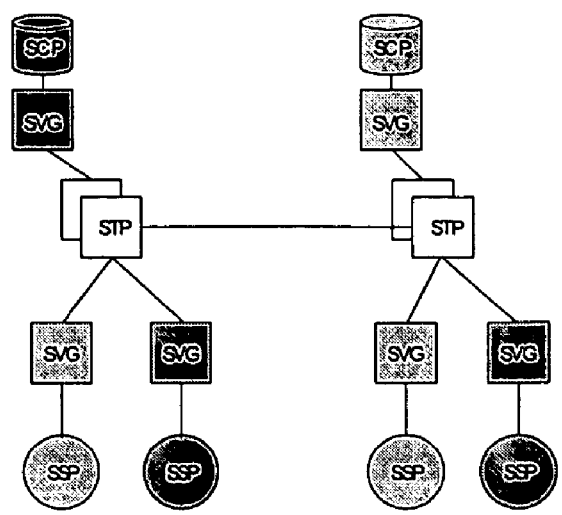
Figure 12: Shared STP Infrastructure between Two Network Operators

SECURE VOICE SIGNALING GATEWAY

FIELD OF THE INVENTION

This invention relates to voice communications over a Public Switched Telephone Network (PSTN) and more particularly to systems and methods of providing enhanced security for voice networks.

BACKGROUND OF THE INVENTION

The traditional public switched telephone network (PSTN) is generally considered to be secure, particularly systems which communicate over land lines.

In recent years, however, voice networks have become deregulated and providers have been forced to open their networks to outside companies. New methods of integrating voice communication with packet networks have been developed. Protocols, such as voice over IP (VOIP), have been investigated primarily as a way of reducing long distance charges conventionally associated with switched voice communications. Packet networks, and in particular the ubiquitous Internet, is known to rely on open concepts which have resulted in hackers and the like breaking into packet networks either maliciously or for some gain. Considerable effort has been spent in developing security systems which will offer some degree of security to packet networks. The integration of traditional switched voice communications with packet networks opens the door for security issues which are of particular concern to high end customers including the military, large corporations and in particular financial institutions. To date, however, there does not appear to have been any developments in the area of signaling security for switched telephone networks (eg. PSTN).

Packet networks in general are known to be moving towards secure protocols utilizing encryption and cryptographic authentication techniques, but to date the same hasn't been observed in traditional voice networks.

Systems also exist for use in connecting switched voice networks to packet voice networks. An example of one such system is the Alcatel 5070 SSG which provides a gateway between the SS7 protocol of the switched networks and a protocol such as SIGTRAN which implements the SS7 protocol over an IP packet network. The Alcatel 5070 SSG allows for signaling traffic from the switched networks domain through traverse packet networks and vice versa.

VPN gateways are typically used to terminate secure IP SEC or SSL protocols in IP networks. These protocols can provide secure and strong cryptographic authentication and encryption of network traffic. It is, accordingly, a principal object of the present invention to apply such authentication and encryption techniques to a switched voice network environment.

SUMMARY OF THE INVENTION

The present invention provides a secure voice signaling gateway (SVSG) which is a system for providing secure voice signaling communications through a packet network. The approaches used by the SVSG are somewhat analogous to those used for IP VPNs. Applications for the SVSG include the tunneling of SS7 signaling protocol through an IP network as well as securing signaling connections between two service switching points (SSP) and implementing a shared SS7 network between network operators. The SVSG uses encryption and digital signature technologies to ensure that the messages received are authentic and secure from outside examination and modification. The SVSG functionality can be implemented in a stand alone unit or can be integrated into other voice telephony equipment, example STP, SSP and SCP network elements.

Therefore, in accordance with the first aspect of the present invention there is provided a method of providing secure voice signaling communications between first and second network elements over a packet network comprising: encrypting a signaling packet payload at the first network element utilizing a security key defining an association between the first and second network elements; transmitting the encrypted packet payload from the first element to the second element; and decrypting the packet payload at the second network element utilizing the security key.

In a second embodiment of this aspect of the invention the signaling packet payload as well as the MTP2 or MTP3 header are encrypted and the address of the first network element is included in the encrypted packet to identify the point of origin of the voice communication. This provides what is known in the application as a masquerading mode.

In accordance with the second aspect of the invention there is provided an apparatus for providing secure voice signaling communications between first and second network elements over a packet network, the apparatus comprising: means to encrypt a signaling packet payload at the first network element utilizing a security key defining an association between the first and second network elements; means to transmit the encrypted packet payload from the first element to the second element; and means at the second network element to decrypt the packet payload utilizing the security key.

In accordance with a third aspect of the invention there is provided a secure voice signaling gateway (SVSG) for integration in an SS7 network for providing secure voice signaling communication over a packet network, the SVSG comprising: a first interface for receiving the voice signaling communication; encryption means for encrypting a signaling packet payload of the signaling communication utilizing a security key; and a transmitting means to transmit the encrypted signaling packet payload via a second interface to an associated SVSG.

BRIEF DESCRIPTION OF THE DRAWINGS

The invention will now be described in greater detail with reference to the attached figures wherein:

FIG. 1 shows a simple view of a SVSG;

FIG. 2 and FIG. 3 show flow charts of encryption and decryption packet processing;

FIG. 4 shows the non-masquerading mode of the SVSG with encryption at the MTP3 layer;

FIG. 5 shows non-masquerading mode using SCCP;

FIG. 6 depicts the tunneling mode of the SVSG with encryption at the MTP3 layer;

FIG. 7 shows the tunneling mode with masquerading and SCCP;

FIG. 8 depicts an SVSG with GTT capabilities;

FIG. 9 depicts a configuration which provides tunneled SS7 through an IP network using standard VPN gateways;

FIG. 10 depicts a simple view of an SS7 network;

FIG. 11 shows an example of secured signaling connection between two SSPs;

FIG. 12 shows an example of a shared SS7 network between network operators.

DETAILED DESCRIPTION OF THE INVENTION

FIG. 1 is a high level representation of the SVSG of the present invention. The SVSG is a device to provide secure communication between two points in a voice network. This functionality is provided by tunneling the voice signaling traffic from one SVSG to the other. The SVSG uses encryption and digital signature technologies to ensure that the messages received are authentic and secure from outsider examination and modification. The SVSG functionality can be implemented in a stand alone unit or can be integrated into other voice telephony equipment.

As shown in FIG. 1 the SVSG receives signaling traffic from a first interface (black), encrypts it according to the origination point code and the destination point code of the packets and sends it out on the other interface (red). Encrypted packets are transmitted to a second SVSG in the network that performs the reverse operation. The SVSG can work at the MTP3 and SCCP layers and possibly at other layers of the stack as well.

In order for the SVSG to function the network must be aware of the keys used for encryption by others. This information can be shared with standard security mechanisms such as shared secret keys, public key infrastructure, key negotiation such as internet key exchange, etc.

The SVSG works in two different modes depending on the address transformations from the first interface to the second interface, namely a masquerading mode and a non-masquerading mode. In the masquerading mode, the SVSG uses its own point code for all packets it emits on the second interface, thus providing identity hiding. In the non-masquerading mode, the SVSG allows the packet to keep the MTP3 header (and the eventual SCCP header).

The tunneling can also be performed in two different modes: first, packet oriented where each packet is encrypted and is then sent to the appropriate SVSG or second, connection oriented where a permanent SCCP connection is established between SVSGs and is used to send the packets.

The simple case of an SVSG working only at the MTP3 layer is described first, and then the modifications and limitations necessary to use SCCP are described.

In a configuration without masquerading, a SVSG encrypts just the payload i.e. not including the MTP3 and SCCP header, of packets received on the first interface and sends them on the second interface, and decrypts the payload of packets received on the second interface and sends then on the first interface.

An illustration of this case is shown in FIG. 4 and FIG. 5. SVSG1 and SVSG2 share the same key for packet encryption. The payload is encrypted using the encryption algorithm with the key defined for the association between SVSG1 and SVSG2.

This mode makes it possible to keep using SCCP functionality in the network such as Global Title Translation (GTT) since only the payload is modified.

In the masquerading mode, however, the SVSG encrypts the full packet, including MTP3 and eventual SCCP header, and puts it in the payload of a MTP3 packet for which the origination point code is the address of the SVSG. This process of address translation is similar to the Network Address Translation used in IP networks. An illustration of this case is shown in FIG. 6 and FIG. 7.

The advantage of masquerading is that it allows more sophisticated network providers to achieve some level of anonymity by hiding the topology of their network from the outside world. From an outside perspective, only the point code of the SVSG is visible.

When masquerading is enabled, SCCP cannot be used to perform Global Title Translation between the two SVSGs. The SVSG should then have some GTT functionality to be at least able to know to which SVSG it should send the packet as is seen in FIG. 8.

The two previous modes work on packet per packet basis. The SVSG also makes it possible to create permanent SCCP connections between SVSGs. All the data sent on these connections is encrypted. The connections are then used to send the packets between SVSGs.

Due to interoperability considerations, the case where not all packets are encrypted is allowed.

Depending on a policy to be defined by the operator, a packet that is not destined for equipment behind a SVSG could be forwarded without encryption or dropped.

The same consideration applies for received packets. A policy to be defined by the operator should define what should be done with a packet that is not encrypted.

In this document, SS7 protocol stacks include the SS7 defined by ITU (Q.700 series) using MTP and ATM, the SS7 defined by T1 organization, and the SS7 on IP defined by the IETF SIGTRAN working group. In addition to the security functions, the SVSG can be applied to different protocols and can permit interoperability between different SS7 flavors.

Depending on the protocol used, the SVSG can use other protocols permitting encryption between two SVSGs. For example, in the case of SIGTRAN usage, it is possible to use IP security mechanisms between two SVSGs (for example IPSec, SSL or TLS). This arrangement can also be achieved by using two traditional SS7 to SIGTRAN gateways and two standard VPN (IPSec, SSL, or TLS) gateways as described in FIG. 9.

The SVSG could be used in different network configurations such as:

FIG. 10 which shows a simple typical SS7 network structure; and

FIG. 11 which shows an example of secured signaling connection between two SSPs.

FIG. 12 shows an example of a shared SS7 network between network operators. In this case, the SVSGs of each type designated by shading only know the keys of the other SVSGs of the same shading. For example, a SSP shown with one type of shading is not able to access a SCP shown by different shading because the two SVSGs are not able to exchange packets.

Although particular embodiments of the invention have been described and illustrated it will be apparent to one skilled in the art that numerous changes can be made without departing from the basic concepts. It is to be understood that any such changes will fall within the full scope of the invention as defined by the appended claims.

We claim:

1. A method of providing secure voice signaling communications between first and second network elements over a packet public switched telephone network (PSTN) comprising:

encrypting a signaling packet payload at the first network element utilizing a security key defining an association between the first and second network elements, wherein the first network element receives the signaling packet payload from a transmission device through a link using SS7 protocols;

transmitting the encrypted packet payload from the first element to the second element through a link only using SS7 protocols; and decrypting the packet payload at the second network element utilizing the security key.

2. The method as defined in claim I of claim 1, wherein the signaling packet payload and an associated header are encrypted at the first network element and decrypted at the second network element.

3. The method as defined in of claim 2, wherein an address of the first network element is included in the encrypted packet and identifies the point of origin thereof.

4. The method as defined in claim I of claim 1, wherein Global Title Translation (GTT) is performed at the first element to determine which network element in the packet network to send the packet.

5. The method as defined in of claim 3, wherein the encrypted packet is a MTP3 packet.

6. The method as defined in of claim 1, further comprising:
the step of determining whether to discard, encrypt and transmit, or transmit without encryption, received signaling packets.

7. The method as defined in of claim 6, wherein the step of determining is based on a policy which includes criteria, source and destination addresses in the packet network.

8. The method of claim 1, wherein the link using only using SS7 protocols comprises a series of connections, wherein each connection uses only SS7 protocols.

9. An apparatus for providing secure voice signaling communications between first and second network elements over a packet public switched telephone network (PSTN) comprising:
means for encrypting a signaling packet payload at the first network element utilizing a security key defining an association between the first and second network elements, wherein the first network element receives the signaling packet payload from a transmitting device through a link using SS7 protocols;
means for transmitting the encrypted packet payload from the first element to the second element through a link only using SS7 protocols; and
means for decrypting the packet payload at the second network element utilizing the security key.

10. The apparatus as defined in of claim 9, wherein said first and second network elements are secure voice signaling gateway (SVSG) devices.

11. The apparatus as defined in of claim 10, wherein the secure communication is provided by tunneling voice signaling traffic from a first SVSG to a second SVSG through a link using only SS7 protocols.

12. The apparatus as defined in of claim 11, wherein the security key is one of:
a shared secret key;
a public key infrastructure, and
an Internet key exchange.

13. The apparatus of claim 9, wherein the link using only using SS7 protocols comprises a series of connections, wherein each connection uses only SS7 protocols.

14. A secure voice signaling gateway (SVSG) for integration in an SS7 network for providing secure voice signaling communication over a packet public switched telephone network (PSTN), the SVSG comprising:
a first interface for receiving the voice signaling communication through a link using SS7 protocols;
encryption means for encrypting a signaling packet payload of the signaling communication utilizing a security key; and
a transmitting means to transmit the encrypted signaling packet payload via a second interface through a link using only SS7 protocols to an associated SVSG.

15. The SVSG as defined in of claim 14 implemented in a stand alone unit.

16. The SVSG as defined in of claim 14 integrated into voice telephony equipment.

17. The SVSG of claim 14, wherein the link using only using SS7 protocols comprises a series of connections, wherein each connection uses only SS7 protocols.

18. A secure voice signaling gateway (SVSG) for integration in an SS7 network used in providing secure voice signaling communication over a packet public switched telephone network (PSTN), the SVSG comprising:
a first interface for receiving an encrypted signaling packet payload of a voice signaling communication through a link using only SS7 protocols;
decryption means for decrypting the encrypted signaling packet payload; and
a transmitting means to transmit the decrypted signaling packet payload via a second interface to an end system through a link using SS7 protocols.

19. The SVSG as defined in of claim 18 implemented in a stand alone unit.

20. The SVSG as defined in of claim 18 integrated into voice telephony equipment.

21. The SVSG of claim 18, wherein the link using only using SS7 protocols comprises a series of connections, wherein each connection uses only SS7 protocols.

* * * * *